(12) United States Patent
Huang

(10) Patent No.: US 11,394,609 B2
(45) Date of Patent: Jul. 19, 2022

(54) EQUIPMENT DEPLOYING SYSTEM AND METHOD THEREOF

(71) Applicant: Wistron Corporation, New Taipei (TW)

(72) Inventor: Cheng-Wei Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 120 days.

(21) Appl. No.: 16/739,132

(22) Filed: Jan. 10, 2020

(65) Prior Publication Data

US 2021/0135937 A1  May 6, 2021

(30) Foreign Application Priority Data

Oct. 30, 2019 (TW) ................................ 108139241

(51) Int. Cl.
*H04L 12/24* (2006.01)
*H04L 41/0803* (2022.01)
(Continued)

(52) U.S. Cl.
CPC ............ *H04L 41/0813* (2013.01); *G06F 8/65* (2013.01); *H04L 41/0886* (2013.01);
(Continued)

(58) Field of Classification Search
CPC ............ H04L 41/0813; H04L 41/0893; H04L 41/0886; H04L 41/12; G06F 8/65;
(Continued)

(56) References Cited

U.S. PATENT DOCUMENTS 9,853,862 B2  12/2017 Ranbro
2004/0056759 A1* 3/2004 Ungs .................. G08B 13/1409
340/5.74
(Continued)

FOREIGN PATENT DOCUMENTS

CN  102594579 A  * 7/2012  ............ H04W 88/12
TW  200411559  7/2004
(Continued)

OTHER PUBLICATIONS

"Office Action of Taiwan Counterpart Application", dated Jun. 9, 2020, p. 1-p. 8.
(Continued)

*Primary Examiner* — Yves Dalencourt
*Assistant Examiner* — Elizabeth Kassa
(74) *Attorney, Agent, or Firm* — JCIPRNET

(57) ABSTRACT

An equipment deploying system and method, which are adapted for a plurality of electronic equipment in an area, are provided. In the method, multiple sub-areas in the area are defined, and a corresponding operation configuration of the electronic equipment respectively for at least one of sub-areas in the area is set correspondingly. Location information of the electronic equipment physically located in the area and equipment information of the electronic equipment are obtained. Whether the location information of the electronic equipment corresponds to one of the sub-areas is determined. In response to the determination that the location information of the electronic equipment is corresponding to one of the sub-areas, the corresponding operation configuration is provided to the corresponding electronic equipment according to a location determined result and the equipment information. The electronic equipment can perform a corresponding operation according to the correspond-
(Continued)

ing operation configuration. Accordingly, the efficiency of equipment deployment can be improved.

19 Claims, 10 Drawing Sheets

(51) Int. Cl.
    *H04L 41/0813*     (2022.01)
    *G06F 8/65*     (2018.01)
    *H04W 64/00*     (2009.01)
    *H04L 41/0893*     (2022.01)
    *H04L 41/08*     (2022.01)
    *H04L 41/12*     (2022.01)
    *H04W 8/24*     (2009.01)

(52) U.S. Cl.
    CPC .......... *H04L 41/0893* (2013.01); *H04L 41/12* (2013.01); *H04W 8/245* (2013.01); *H04W 64/003* (2013.01)

(58) Field of Classification Search
    CPC ... H04W 64/003; H04W 8/245; H04W 16/18; H04W 64/00
    USPC .......................................................... 709/229
    See application file for complete search history.

(56) References Cited

U.S. PATENT DOCUMENTS

| | | |
|---|---|---|
| 2004/0199911 A1 | 10/2004 | Lo et al. |
| 2007/0005311 A1* | 1/2007 | Wegerich ............... G05B 17/02 703/2 |
| 2010/0180016 A1* | 7/2010 | Bugwadia ............. H04W 24/02 709/220 |
| 2011/0187503 A1* | 8/2011 | Costa ................... H05K 7/1498 340/8.1 |
| 2012/0144044 A1* | 6/2012 | Verma ....................... G06F 8/61 709/227 |
| 2013/0107041 A1* | 5/2013 | Norem ............... H04N 5/23206 348/169 |
| 2013/0198740 A1* | 8/2013 | Arroyo ............... H04L 41/0806 718/1 |
| 2014/0150064 A1* | 5/2014 | Wifvesson ............. H04L 63/08 726/3 |
| 2014/0240100 A1* | 8/2014 | Johns ................. G06K 7/10356 340/10.6 |
| 2015/0253028 A1* | 9/2015 | Masuyama ........ H05K 7/20836 700/276 |
| 2015/0271280 A1* | 9/2015 | Zhang .................... H04L 67/22 709/224 |
| 2015/0341210 A1 | 11/2015 | Ranbro |
| 2016/0035246 A1* | 2/2016 | Curtis .................... H04L 67/10 340/815.4 |
| 2016/0044629 A1* | 2/2016 | Larson ............... G06K 7/10366 340/8.1 |
| 2018/0219869 A1* | 8/2018 | Kumar .................. G01S 5/0226 |
| 2019/0041637 A1* | 2/2019 | German ............... G06T 19/006 |
| 2019/0261128 A1 | 8/2019 | Lyman et al. |
| 2020/0334393 A1* | 10/2020 | Wodrich ................... G01S 5/12 |

FOREIGN PATENT DOCUMENTS

| | | |
|---|---|---|
| TW | 200421172 | 10/2004 |
| TW | 201547286 | 12/2015 |

OTHER PUBLICATIONS

Office Action of Taiwan Counterpart Application, dated Mar. 2, 2022, pp. 1-8.
Office Action of Taiwan Counterpart Application, dated Mar. 2, 2021, pp. 1-8.

* cited by examiner

EQUIPMENT DEPLOYING SYSTEM AND METHOD THEREOF

CROSS-REFERENCE TO RELATED APPLICATION

This application claims the priority benefit of Taiwan application serial no. 108139241, filed on Oct. 30, 2019. The entirety of the above-mentioned patent application is hereby incorporated by reference herein and made a part of this specification.

BACKGROUND OF THE INVENTION

1. Field of the Invention

The invention relates to an equipment deployment planning technology, and particularly to an equipment deploying system and method.

2. Description of Related Art

Enterprises, institutions or stores may all have the need to deploy lots of equipment. It is worth noting that the current manner of deploying (or using) equipment by the operator or related personnel is usually individual configurations according to the need (for example, software update, firmware update, configuration file provision or the like). However, there are at least two things causing inconveniences in existing equipment deployment: first, if there are too many equipment deployed (or used), it may take lots of manpower or too much time to configure all the equipment one by one; and second, every time an equipment is replaced, the newly replaced equipment needs to be re-configured. Thereby, the existing equipment deploying method still needs to be improved.

SUMMARY OF THE INVENTION

In view of this, embodiments of the invention provide an equipment deploying system and method, which can automatically provide a corresponding operation configuration based on an equipment location, thereby improving convenience and efficiency.

The equipment deploying method according to an embodiment of the invention is adapted for a plurality of electronic equipment in an area, and includes, but is not limited to, the following steps: multiple sub-areas in the area is defined, and corresponding operation configuration of the at least one electronic equipment respectively for at least one of the sub-areas in the area are set correspondingly. Location information of the electronic equipment physically located in the area and equipment information of the electronic equipment are obtained. Whether the location information of the electronic equipment corresponds to one of the sub-areas is determined. The corresponding operation configuration is provided to the corresponding electronic equipment physically located in the one of the sub-areas according to a location determined result and the equipment information in response to the determination that the location information of the at least one electronic equipment being corresponding to one of the sub-areas. The electronic equipment can perform a corresponding operation according to the corresponding operation configuration.

In another aspect, the equipment deploying system according to another embodiment of the invention is adapted to deploy at least one electronic equipment in an area, and includes a communication transceiver and a processor. The communication transceiver is configured to transmit or receive data. The processor is electrically coupled to the communication transceiver, defines multiple sub-areas in the area, sets corresponding operation configuration of the electronic equipment respectively for at least one of sub-areas in the area, obtains location information of the electronic equipment physically located in the area and equipment information of the electronic equipment, determines whether the sub-area corresponding to the location information of the electronic equipment corresponds to one of the sub-areas, and provide the corresponding operation configuration to the corresponding electronic equipment physically located in one sub-area by the communication transceiver according to a location determined result and the equipment information in response to the determination that the location information of the at least one electronic equipment is corresponding to one of the sub-areas. The electronic equipment can perform a corresponding operation according to the corresponding operation configuration.

In another aspect, the equipment deploying method according to an embodiment of the invention is adapted for a plurality of electronic equipment in an area, and includes, but is not limited to, the following steps: a definition of multiple sub-areas in the area is received. A corresponding operation configuration setting of the electronic equipment respectively for at least one of the sub-areas is received correspondingly. Location information of the at least one electronic equipment physically located in the area and equipment information of the at least one electronic equipment are received. Whether the location information of the at least one electronic equipment corresponds to one of the sub-areas is determined. The corresponding operation configuration is provided to the corresponding electronic equipment physically located in the sub-area according to a location determined result and the equipment information in response to the determination that the location information of the at least one electronic equipment is corresponding to one of the sub-areas.

Based on the above, the equipment deploying system and method according to the exemplary embodiments of the invention can monitor the location of each electronic equipment, determine whether each electronic equipment is located (or positioned) in a specified sub-area, and accordingly provide a corresponding operation configuration. Thereby, as long as the user places or puts the electronic equipment in a specific location, the exemplary embodiments of the invention can automatically provide the electronic equipment with a predetermined operation configuration, thereby improving the deployment efficiency and lowering the manpower cost.

To make the features and advantages of the invention clear and easy to understand, the following gives a detailed description of embodiments with reference to accompanying drawings.

DESCRIPTION OF THE EMBODIMENTS

Figure 1:
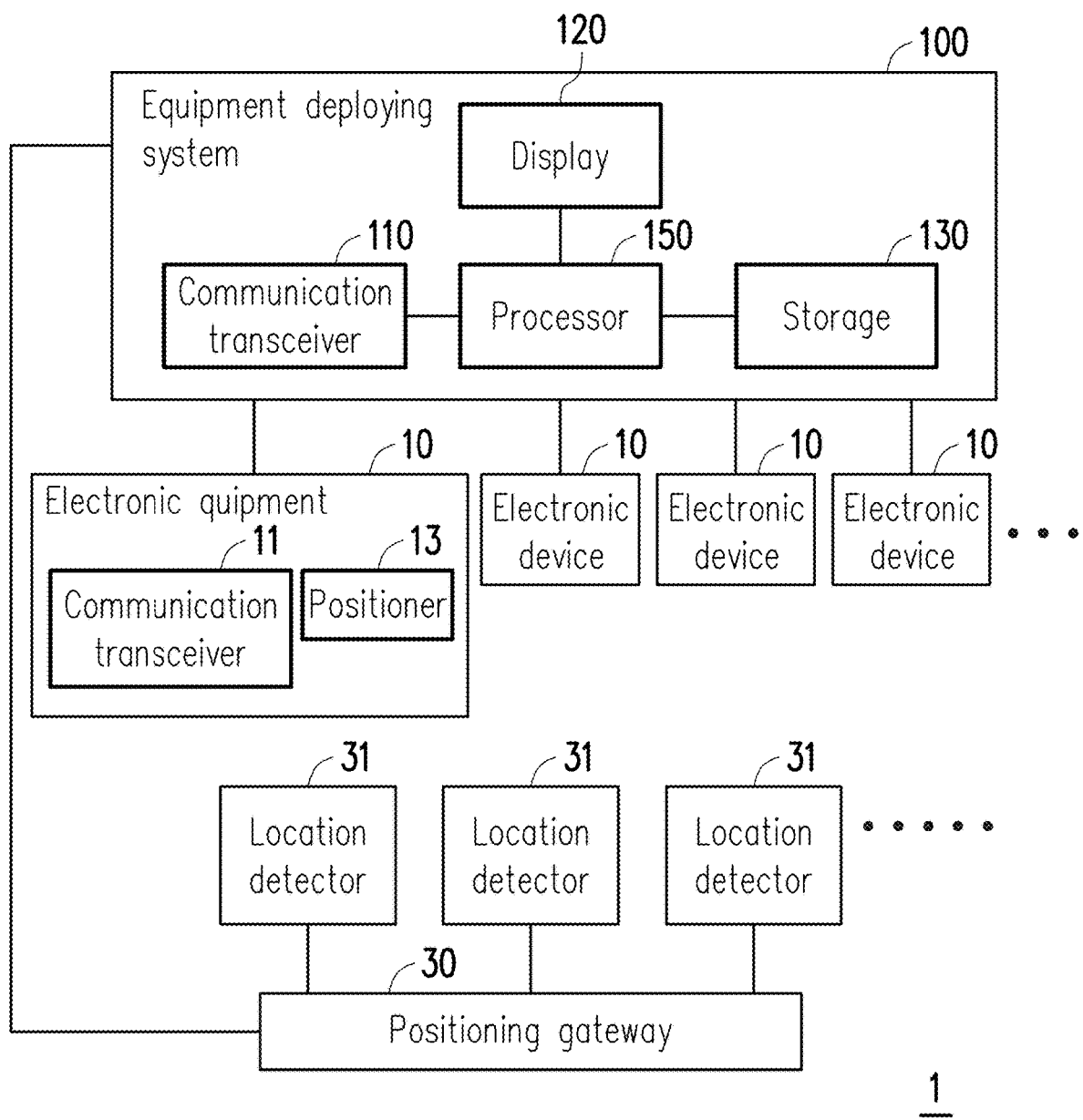
FIG. 1 is a schematic diagram of a system according to an embodiment of the invention.

FIG. 1 is a schematic diagram of a system according to an embodiment of the invention. Referring to FIG. 1, the system 1 includes, but is not limited to, a plurality of electronic equipment 10 and an equipment deploying system 100.

The electronic equipment 10 may be a computer, a server, a detection equipment, a telecommunication equipment, a power equipment, a smart home appliance, a production line machine, a catering equipment, an office/business equipment, a sensing apparatus, or various types of electronic apparatuses. In the embodiment of the invention, the electronic equipment 10 includes, but is not limited to, a communication transceiver 11 and a positioner 13 (built in, externally connected to or disposed on a body of the electronic equipment 10).

The communication transceiver 11 may be a communication transceiver or serial communication interface (such as RS-232) that supports, for example, mobile communication of fourth generation (4G) or other generations, Wi-Fi, Bluetooth, infrared, radio frequency identification (RFID), Ethernet, optical network, etc., and may also be a universal serial bus (USB), Thunderbolt or other communication transmission interface. In the embodiment of the invention, a communication transceiver 110 is configured to communicate with each electronic equipment to transmit or receive data, and may be connected to an internal area network or an external international network (Internet).

The positioner 13 may be a receiver, a transmitter or a transceiver (i.e., the positioner 13 may also be the communication transceiver 11) using various types of wireless signals or electromagnetic waves such as Wi-Fi, Bluetooth, infrared, RFID, Zigbee, ultra-wideband, ultrasonic, etc., and accordingly actively or passively transmit or receive a wireless signal or an electromagnetic wave. The wireless signal or electromagnetic wave may be used for location determining for the electronic equipment 10 to which the positioner 13 belongs, and will be described in detail in the subsequent embodiments. In some embodiments, the positioner 13 may also be a satellite positioner of a Global Positioning System (GPS), a Galileo, a Beidou Navigation Satellite System, etc., and accordingly directly obtain location information (for example, longitude and latitude coordinates, relative location, etc.). In another embodiment, the positioner 13 may also be a mobile communication transceiver and may implement positioning based on base station information.

The equipment deploying system 100 may be a computing equipment such as a desktop computer, a notebook computer, a smart phone, various types of servers, a workstation, and the like. The equipment deploying system 100 includes, but is not limited to, the communication transceiver 110, a storage 130, and a processor 150.

For the implementations of the communication transceiver 110, reference may be made to the description of the communication transceiver 11, and the descriptions thereof are omitted herein. It should be noted that the communication transceiver 110 may communicate directly or indirectly with the communication transceiver 11 (for example, via a router, gateway, or base station).

The storage 130 may be any type of fixed or removable random access memory (RAM), read-only memory (ROM), flash memory, traditional hard disk drive (HDD), solid-state drive (SSD) or similar elements, or a storage of a combination of the above elements. In the embodiment of the invention, the storage 130 is configured to store temporary or permanent data (for example, location information, plane layout maps, operation configurations, equipment information, etc.), software modules or other files and data, and the details thereof will be described in the subsequent embodiments.

The processor 150 is electrically coupled to the communication transceiver 110 and the storage 130. The processor 150 may be a central processing unit (CPU), or other programmable general purpose or special purpose microprocessor, digital signal processor (DSP), programmable controller, application-specific integrated circuit (ASIC) or other similar elements, or a combination of the above elements. In the embodiment of the invention, the processor 150 is configured to perform all or most of operations of the equipment deploying system 100, and may load and perform various software modules, files, and data recorded by the storage 130.

In an embodiment, the equipment deploying system 100 further includes one or more displays 120. The display 120 may be a display such as a liquid crystal display (LCD), an organic light emitting diode (OLED) display, and the like, and is configured to present a picture.

In some embodiments, the system 1 further includes one or more location detectors 31, which are configured to detect/read and identify a coordinate location of the positioner 13 by using the corresponding wireless signal or electromagnetic wave communication manner in the previous description and transmit the location information of all the positioners 13 back to the equipment deploying system 100 through a positioning gateway 30. In other words, in the embodiment of the invention, the positioning gateway 30 is configured to collect location information (for example, signal strength, absolute location, relative location, relative distance, coordinates, or the like) of the electronic equipment 10, and provide the location information to the equipment deploying system 100. In other embodiments, the electronic equipment 10 may also directly provide its own or other's location information to the equipment deploying system 100 through other communication channels, rather than through the positioning gateway 30.

In order to facilitate the understanding of the operation flow of the embodiment of the invention, the deploying flow of the electronic equipment 10 in the system 1 in the embodiment of the invention will be described in detail below in the following embodiments. Hereinafter, the method of the embodiment of the invention will be described in conjunction with the system 1, the electronic equipment 10, and various equipment, elements, and modules in the equipment deploying system 100. The various flows of the method may be adjusted accordingly according to the implementation situation, and are not limited thereto.

Figure 2:
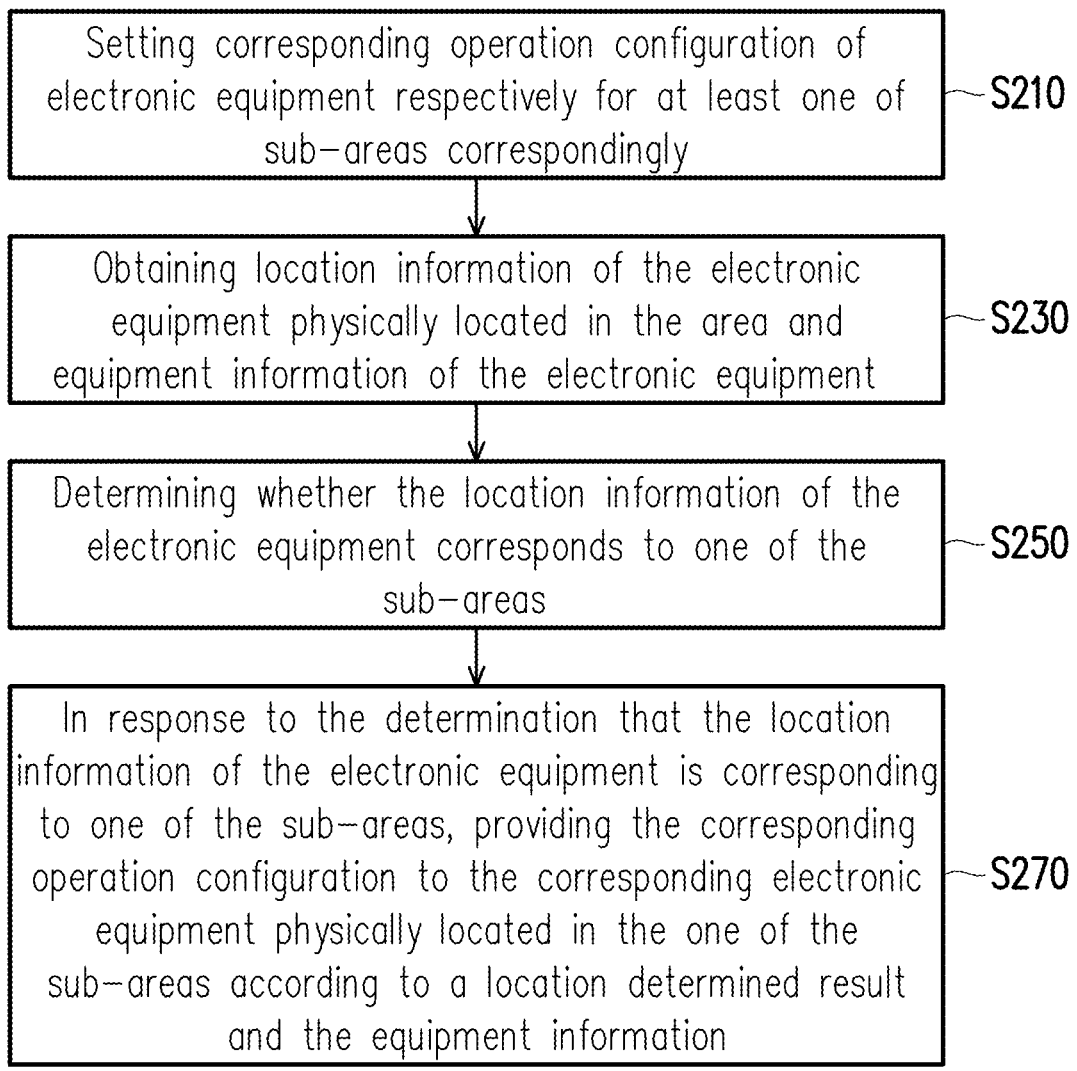
FIG. 2 is a flow chart of an equipment deploying method according to an embodiment of the invention.

FIG. 2 is a flow chart of an equipment deploying method according to an embodiment of the invention. Referring to FIG. 2, a processor 150 of an equipment deploying system 100 sets corresponding operation configuration of the electronic equipment respectively for at least one of sub-areas correspondingly (step S210). Specifically, it is assumed that the area is an environment for disposing the electronic equipment 10, and the environment is, for example, a factory, a store, an office, a living room, a street, or the like. A display 120 of the equipment deploying system 100 may provide a user interface (UI) (presented by a webpage, an application or the like) to allow the user to perform a configuration operation through an input equipment such as a touch panel, a keyboard/mouse or the like. The user interface may include plane/stereo layout maps, street layout maps, electronic maps, and other related graphical information of spatial locations of various application types. The processor 150 may plan the location where the electronic equipment 10 is to be placed/put based on the user's configuration operation on the user interface. The processor 150 may receive a definition of sub-areas in the area and define the sub-areas. According to different planning requirements, the area may be divided into a plurality of sub-areas, and the shape, size and location of the sub-areas can be decided by the user. Electronic equipment 10 of the same or different types, brands, and/or models may be disposed in different sub-areas.

Figure 3A:
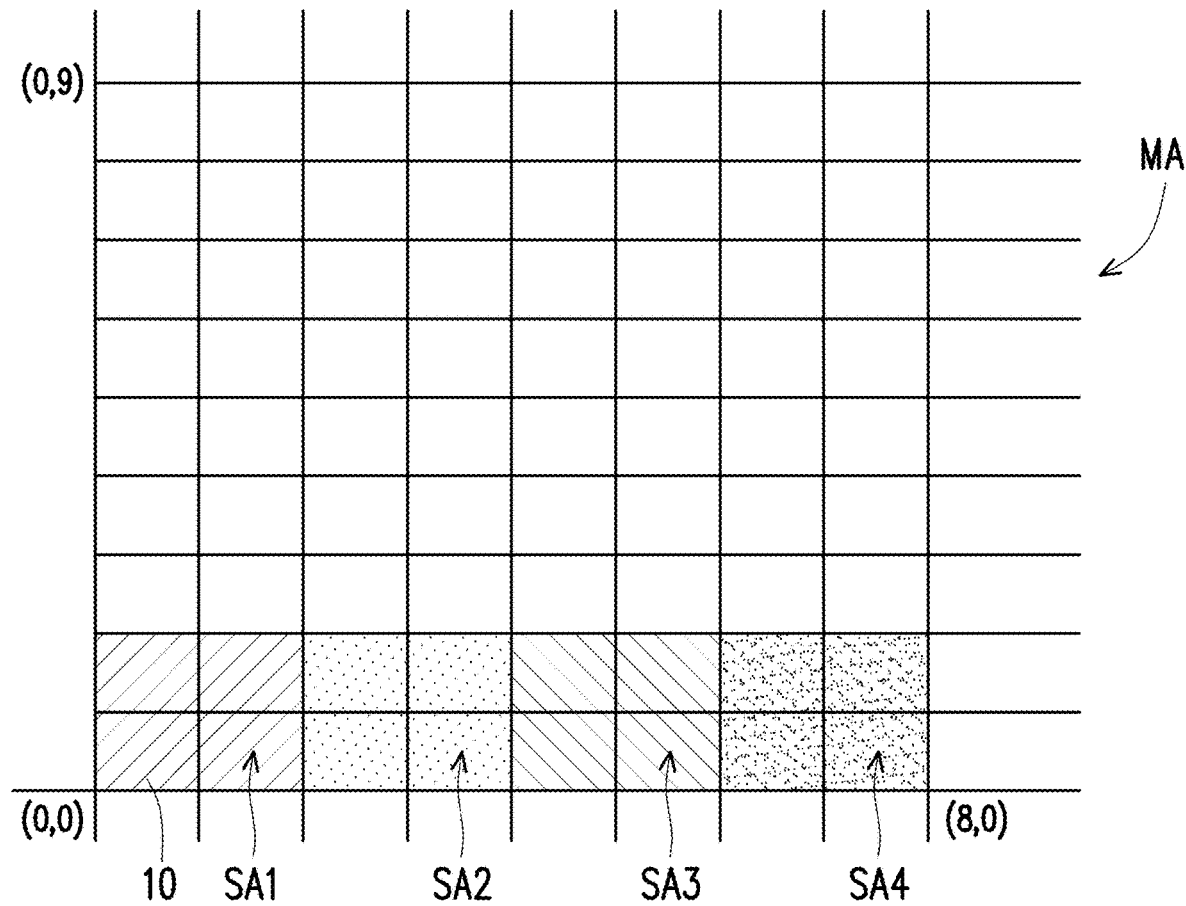
FIG. 3A and FIG. 3B are examples illustrating area planning.
Figure 3B:
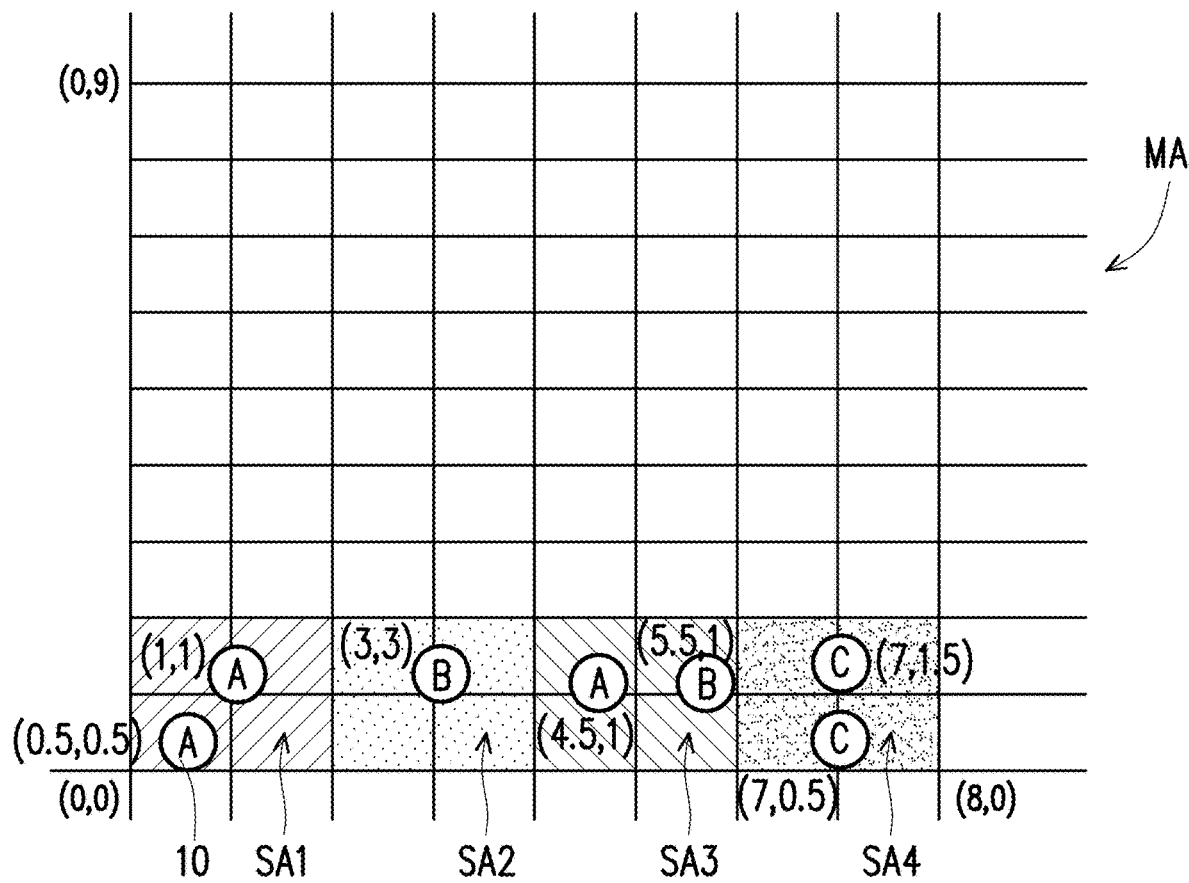

For example, FIG. 3A and FIG. 3B are examples illustrating area planning. Referring to FIG. 3A, the area MA includes four sub-areas SA1, SA2, SA3, and SA4 (distinguished by different network bottoms in the figure). The sub-areas SA1-SA4 do not overlap. The sub-area SA1 is, for example, used for disposing a Model A electronic equipment 10, and the sub-area SA3 is, for example, used for disposing Model A and Model B electronic equipment 10, but is not limited thereto. Referring to FIG. 3B, various types of electronic equipment 10 may be planned in the sub-areas SA1, SA2, SA3, and SA4 (in the figure, the electronic equipment 10 of different models are respectively distinguished by letters A, B, and C in the symbol ◯).

In addition, the processor 150 may receive a corresponding operation configuration setting of at least one electronic equipment 10 respectively for at least one of the sub-areas correspondingly and decide an operation configuration corresponding to each electronic equipment 10 in each sub-area based on the user's configuration operation on the user interface. In the embodiment of the invention, the electronic equipment 10 may perform a corresponding operation according to the operation configuration of the location condition. The operation configuration is, for example, a software/firmware update file, a configuration file, an operating command (for example, power on/off, switching function, transmission of data, etc.) or the like, and the corresponding operation of the electronic equipment 10 is related to parameter configuration update or command execution.

The processor 150 obtains location information of each electronic equipment 10 physically located in the area and equipment information of the electronic equipment 10 (step S230). Specifically, in terms of the location information, what the processor 150 wants to obtain is the actual positioning/disposing location of the electronic equipment 10 in the deployment environment (strictly speaking, the location of the positioner 13, in the embodiment of the invention, the location of the electronic equipment 10 is represented by the location of the positioner 13). There are many ways to obtain the location information. In an embodiment, the location information is obtained by an indoor positioning mechanism. The indoor positioning mechanism is, for example, based on a communication protocol of Wi-Fi, RFID, Bluetooth, Zigbee or the like, and based on a positioning principle such as triangulation, multilateration, proximity detection or the like. Observed quantities of wireless signal/electromagnetic wave strength, signal/electromagnetic wave propagation time and amount of movement transmitted or received by the location detectors 31 relative to the positioner 13 can be used to estimate the location information (for example, relative location or absolute location) of the electronic equipment 10 by the aforementioned positioning principle. It should be noted that the computation of the location information may be performed in the equipment deploying system 100, the electronic equipment 10, the positioning gateway 30, or other electronic equipment, which is not limited in the embodiment of the invention. In addition, the processor 150 may obtain the computation result (i.e., the location information of each electronic equipment 10) through the communication transceiver 110 or by itself. In another aspect, based on different positioning technologies, the wireless signal transmitted by the positioner 13 may further include an equipment identification code, a model, a serial number, a number, or other equipment information for identifying the electronic equipment 10.

Figure 4:
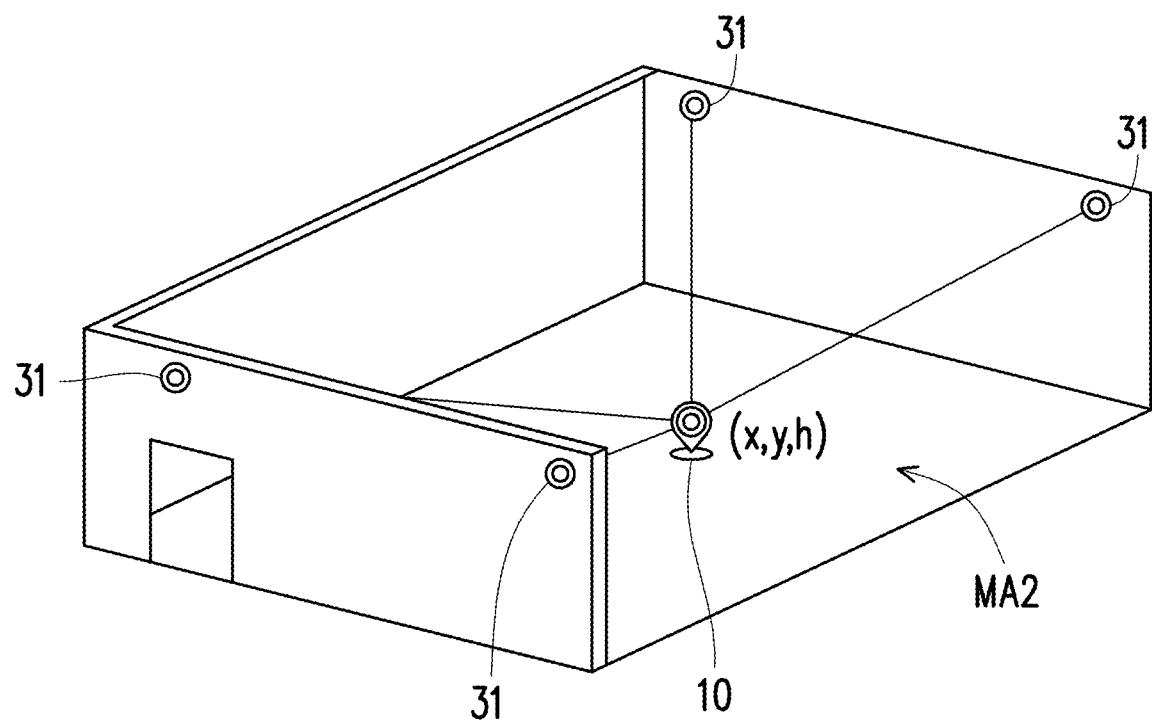
FIG. 4 is an example illustrating an indoor positioning mechanism.

For example, FIG. 4 is an example illustrating an indoor positioning mechanism. Referring to FIG. 4, four location detectors 31 are disposed in an area MA2, and the locations of the location detectors 31 are known. The positioner 13 of the electronic equipment 10 broadcasts the wireless signal, for example, through a Bluetooth technology, and the location detector 31 may decide a relative distance from the electronic equipment 10 according to a signal strength of a wireless signal (for example, a beacon signal) transmitted by the electronic equipment 10. The location information (for example, coordinates (x, y, h)) of the electronic equipment 10 may be estimated using the relative distances obtained by the three location detectors 31 and the respective location information by a triangulation algorithm, and be transmitted via the positioning gateway 30 to the equipment deploying system 100. In another embodiment of the invention, the positioner 13 of the electronic equipment 10 may be an RFID tag, the location detector 31 may be an RFID reader, and similarly, the location information of the electronic equipment 10 may be estimated by the triangulation algorithm.

In another embodiment, the location information of the electronic equipment 10 is obtained by a satellite positioning or base station positioning technology. The electronic equipment 10 may obtain latitude and longitude information of the satellite positioning by itself, or obtain a current registered or neighboring base station identification code, and accordingly use it as the location information. In the above two embodiments, the positioner 13 may respectively refer to a satellite signal receiver and a mobile communication network receiver, and the location detector 31 may respectively refer to a positioning satellite and a base station. The electronic equipment 10 then transmits its own location information to the equipment deploying system 100.

In addition, in an embodiment, the processor 150 may define the area configured in step S210 to form a coordinate system, and decide coordinates of the location information of the electronic equipment 10 in the coordinate system. The coordinate system may be two-dimensional or three-dimensional, and its unit length and direction may be decided according to requirements. Taking FIG. 3B as an example, the area MA forms a two-dimensional coordinate system, and the unit length is assumed to be 1 meter. A certain electronic equipment 10 is physically located at coordinates (0.5, 0.5), i.e., 50 centimeters away from the horizontal axis and the vertical axis respectively.

It should be noted that the format of the location information is not limited to the coordinates, and the relative direction and distance, the latitude and longitude, and other formats may also be applied to the embodiments of the invention.

In another aspect, in terms of the equipment information, the equipment information may be an equipment identification code (e.g., serial number, model, property number, etc.), a configuration version (regarding a version number of the version of its system or specific software/firmware and release/update time), an equipment type, security authentication data, or any combination of the above data/information. Some or all of the equipment information may be transmitted through the positioner 13 or the communication transceiver 11 of the electronic equipment 10 during the aforementioned positioning phase, and may also be transmitted after confirming that the electronic equipment 10 has passed security verification.

Figure 5:
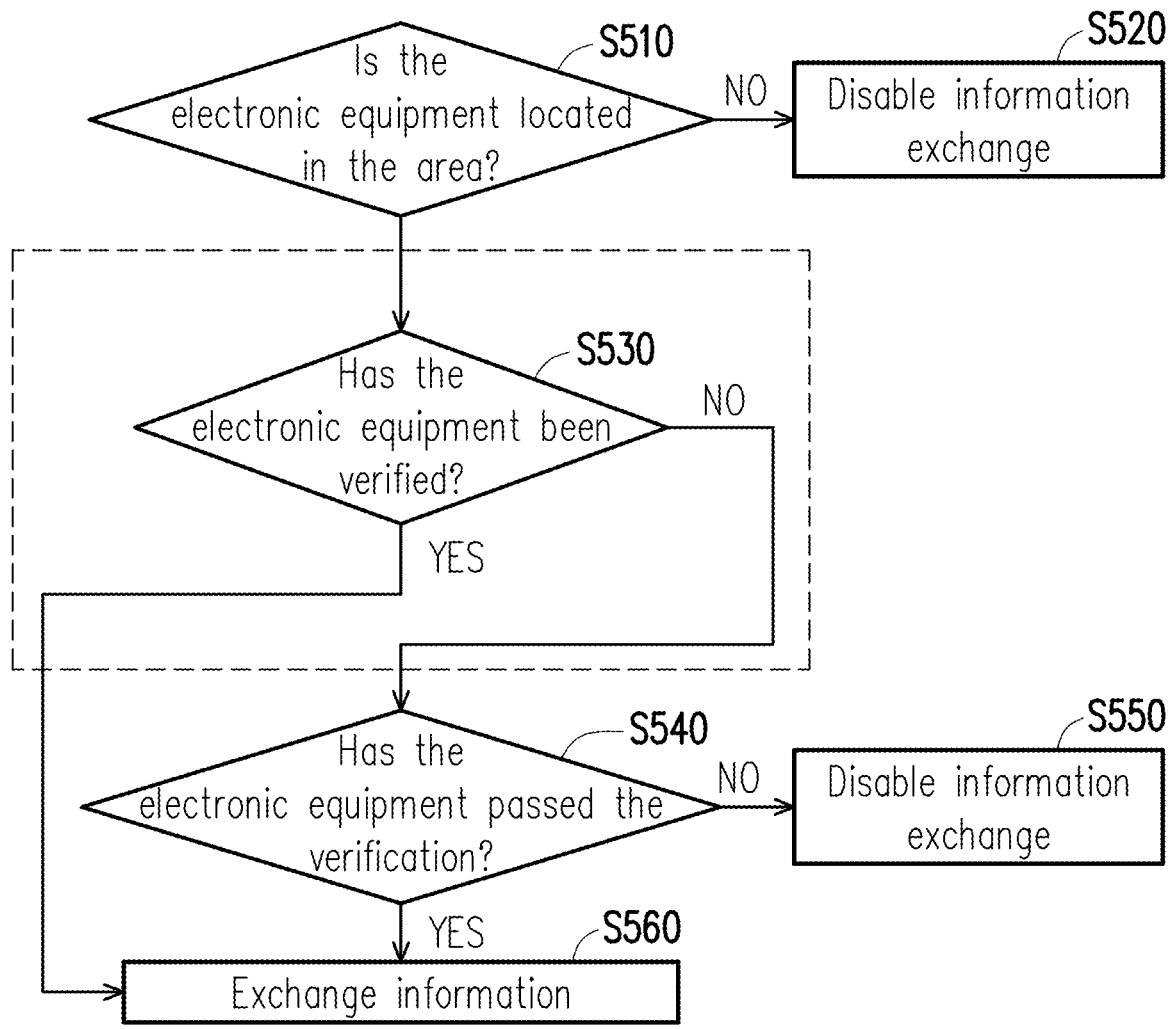
FIG. 5 is a flow chart of verification and area determining according to an embodiment of the invention.

FIG. 5 is a flow chart of verification and area determining according to an embodiment of the invention. Referring to FIG. 5, the processor 150 may determine whether an electronic equipment 10 is physically located outside of the sub-areas according to the location information of the electronic equipment 10. In step S210, the processor 150 plans the sub-areas to obtain a boundary range (possibly coordinates, latitude and longitude or other formats) of the sub-areas. The processor 150 may also confirm whether the electronic equipment 10 is outside the range formed by the sub-areas based on the boundary range. Taking FIG. 3B as an example, the Model A electronic equipment 10 has coordinates (0.5, 0.5) and is physically located in the sub-area SA1, and therefore, is not outside the sub-areas SA1-SA4.

If the electronic equipment 10 is physically located outside of the sub-areas, the processor 150 disables/does not perform information exchange with the electronic equipment 10 through the communication transceiver 110, thereby disabling/not further providing the operation configuration to the electronic equipment 10 (step S520). In some embodiments, the processor 150 may present information that the electronic equipment 10 at a certain location is beyond a reasonable range through the aforementioned user interface. In contrast, if the electronic equipment 10 is physically located in the sub-areas, the processor 150 performs security verification on the electronic equipment 10 through the communication transceiver 110, and confirms whether the electronic equipment 10 passes the verification (step S540).

Figure 6:
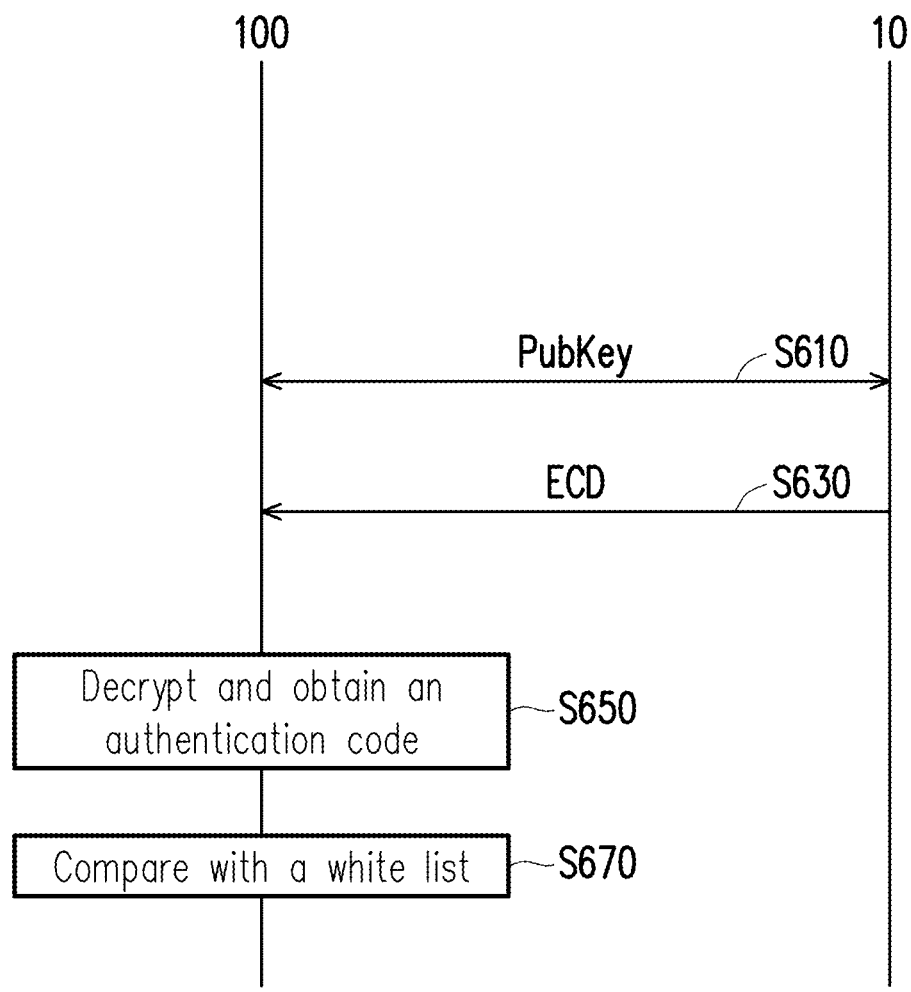
FIG. 6 is a flow chart of security verification according to an embodiment of the invention.

FIG. 6 is a flow chart of security verification according to an embodiment of the invention. Referring to FIG. 6, the processor 150 may establish in advance a white list in which equipment identification codes of allowed/secure/legal electronic equipment 10 are recorded. For example, the equipment identification code is a barcode on a body of the electronic equipment 10. The electronic equipment 10 may obtain a public key PubKey from the equipment deploying system 100 (step S610). The electronic equipment 10 may encrypt an authentication code according to the public key PubKey and transmit the encrypted data ECD to the equipment deploying system 100 (step S630). The processor 150 decrypts the encrypted data ECD and a private key and accordingly obtains the authentication code of the electronic equipment 10 (step S650). The processor 150 may further compare the authentication code with the white list to confirm whether the authentication code is on the white list (step S670). If the authentication code is on the white list, the electronic equipment 10 passes the security verification.

In contrast, if the authentication code is not on the white list, the electronic equipment 10 fails to pass the security verification.

It should be noted that there are many types of security verification mechanisms, such as specific passwords, security codes, and the like, and the embodiments of the invention do not limit the type of the security verification mechanism.

Referring to FIG. 5, if a certain electronic equipment 10 fails to pass the security verification, the processor 150 disables/does not perform information exchange with the electronic equipment 10 through the communication transceiver 110, thereby disabling/not further providing the operation configuration to the electronic equipment 10 (step S550). In some embodiments, the processor 150 may present information that the electronic equipment 10 at a certain location fails to pass the verification through the aforementioned user interface. In contrast, if the electronic equipment 10 passes the security verification, the processor 150 performs information exchange with the electronic equipment 10 through the communication transceiver 110 (step S560). The information exchanged here may be the equipment information of the aforementioned electronic equipment 10.

In order to improve the verification efficiency, in an embodiment, if the electronic equipment 10 passes the security verification, the equipment deploying system 100 may allow the next security verification on the electronic equipment 100 to be ignored. For example, the equipment deploying system 100 provides a special tag or information or annotation on the white list as an evidence of passing the security verification. Referring to FIG. 5, the processor 150 may confirm whether the electronic equipment 10 has been verified (step S530). For example, the processor 150 may determine whether the electronic equipment 10 has transmitted the special tag or information or has been annotated in the white list. If the electronic equipment 10 has not previously passed the verification, it is required to perform security verification on the electronic equipment 10 (step S540). In contrast, if the electronic equipment 10 has already passed the verification, the equipment deploying system 100 may directly perform information exchange with the electronic equipment 10 (step S560)

It should be noted that, according to the site situation, the sequence of the foregoing steps S510 and S540 may be changed. That is, verification determining is performed prior to area determining. For example, assuming there are many invalid electronic equipment 10 at the site, the processor 150 may preferentially determine whether they are valid equipment in advance (i.e., verification determining first), thereby reducing subsequent computation. In addition, in some embodiments, the processor 150 may also perform one or neither of steps S510 and S540. For example, it is assumed that the planned specific area at the site is used for disposing the electronic equipment 10, or that all of the electronic equipment 10 have been verified for security in advance.

After obtaining the location information and the equipment information, referring to FIG. 2, the processor 150 determines whether the location information corresponds to one of the sub-areas (step S250). In other words, the processor 150 determines the sub-area in which the electronic equipment 10 is physically located. Taking FIG. 3B as an example, the electronic equipment 10 with coordinates (1, 1) is physically located in the sub-area SA1. It should be noted that the processor 150 may also determine the sub-area SA1 for the electronic equipment 10 in the foregoing step S510.

Next, the processor 150 provides a corresponding operation configuration according to a location determined result and the equipment information in response to that the determination that the location information of the at least one electronic equipment 10 is corresponding to one of the sub-areas (step S270). Specifically, the location determined result is a determined result of step S250. For example, the number or identification code of the sub-area in which the electronic equipment 10 is physically located, or the electronic equipment 10 is not in the planned sub-area.

In an embodiment, the equipment information includes an equipment identification code, and the processor 150 obtains the operation configuration corresponding to the equipment identification code in the corresponding sub-area. In the present embodiment, assuming that electronic equipment 10 of different types or different models (corresponding to equipment identification code) may be planned in a single sub-area, and the processor 150 selects only the operation configuration of the corresponding predetermined equipment identification code in the sub-area, and transmits the operation configuration to the electronic equipment 10 through the communication transceiver 110. For example, an electronic equipment 10 in a certain sub-area includes a sensor and a computer, and the processor 150 provides a corresponding operation configuration to the sensor for a sensing operation (i.e., the operation is related to command execution).

In another embodiment, the equipment information includes a configuration version. For example, a version number of the version of the system or specific software/firmware and release/update time. The processor 150 determines a version difference between the configuration version and the operation configuration, and provides a corresponding and correct operation configuration according to a comparison of the version difference (i.e., the operation is related to configuration update). The version difference may be the difference in the version number or the release/update time. For example, the processor 150 determines whether the version number provided by the electronic equipment 10 is higher than or equal to the version number corresponding to the operation configuration, or whether the release time is later than or identical to the release time corresponding to the operation configuration.

Figure 7:
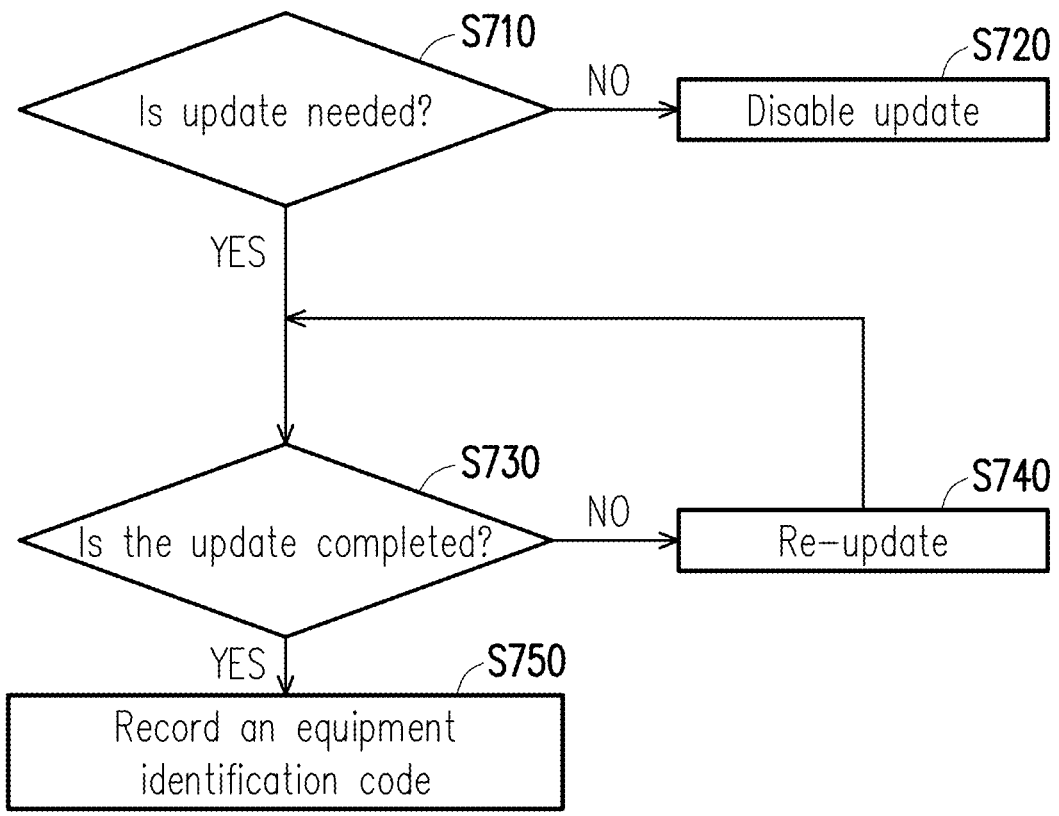
FIG. 7 is a flow chart of configuration update according to an embodiment of the invention.

FIG. 7 is a flow chart of configuration update according to an embodiment of the invention. Referring to FIG. 7, the processor 150 determines whether the electronic equipment 10 needs to be updated based on the version difference (step S710) (i.e., whether an update file needs to be provided). If the version difference is allowed (for example, the version number of the electronic equipment 10 is higher or identical, or the release time is later or identical, etc.), the processor 150 disables updating the electronic equipment 10 through the operation configuration (i.e., the update file is not provided through the communication transceiver 110) (step S720). In contrast, if the version difference is not allowed (for example, the version number of the electronic equipment 10 is lower, or the release time is earlier, etc.), the processor 150 updates the electronic equipment 10 through the operation configuration (i.e., the update file is provided through the communication transceiver 110), and confirms whether the update is completed (step S730). If the allowed waiting time expires or a message that the electronic equipment 10 reports update failure is received (i.e., the update is not completed), the processor 150 provides the operation configuration again through the communication transceiver 110 or requests the electronic equipment 10 to be re-updated (step S740). In contrast, if the electronic equipment 10 reports successful update, the processor 150 records the corresponding equipment identification code of the electronic equipment 10 (step S750) to avoid repeated update.

It should be noted that the foregoing steps S230 to S270 may be repeatedly performed every specific period or in response to a specific triggering behavior (for example, a situation that the electronic equipment 10 transmits a specific broadcast message, the electronic equipment 10 fails, the equipment deploying system 100 is started, etc.). Thereby, the embodiments of the invention can be adapted to dynamic deployment, for example, movement, replacement or the like of the electronic equipment 10.

Figure 8:
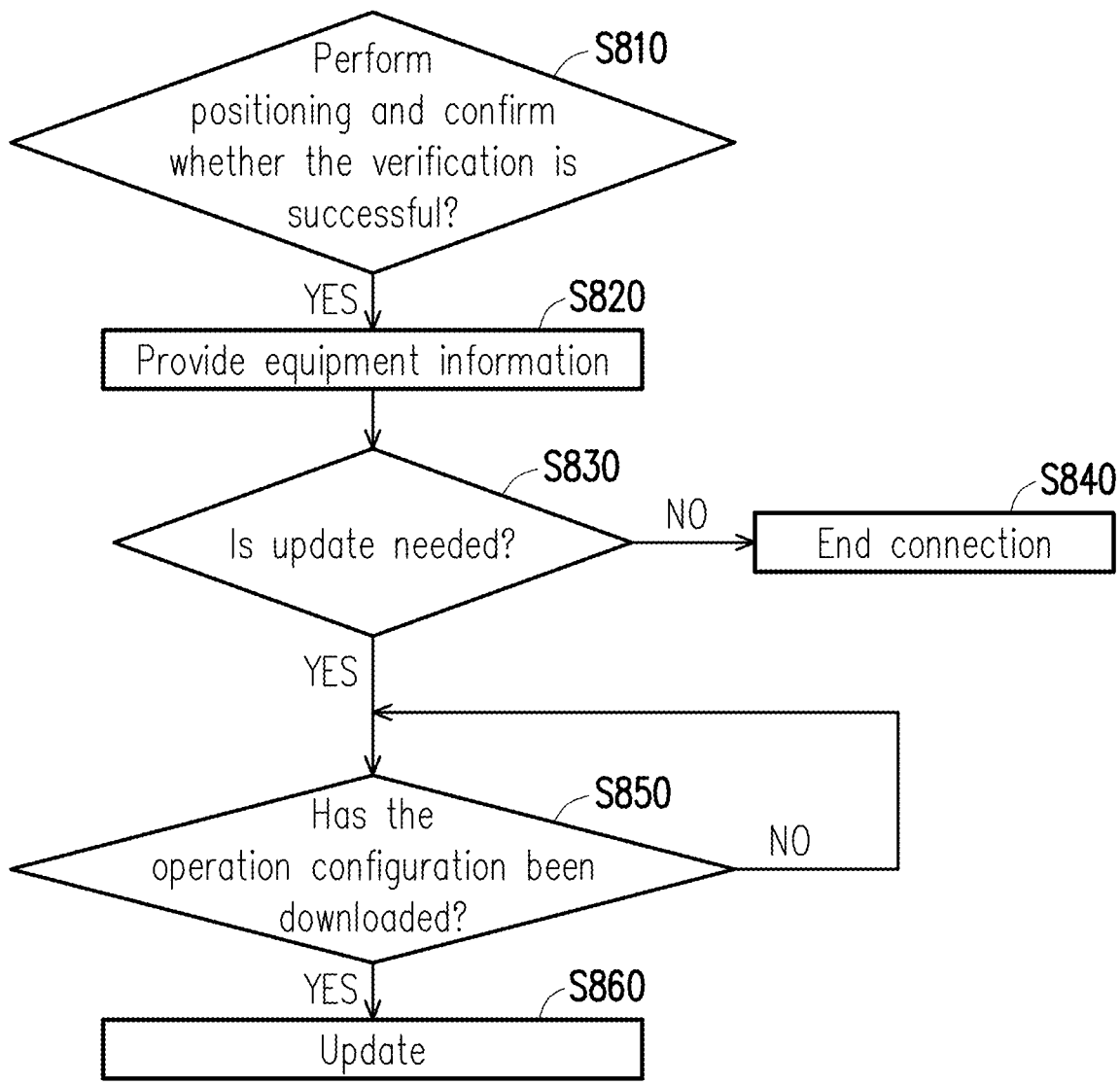
FIG. 8 is a flow chart of update of an electronic equipment according to an embodiment of the invention.

In another aspect, from the viewpoint of the electronic equipment 10, FIG. 8 is a flow chart of update of the electronic equipment 10 according to an embodiment of the invention. Referring to FIG. 8, the positioner 10 of the electronic equipment 10 transmits/receives a wireless signal or directly obtains latitude and longitude position information so as to perform positioning. In another aspect, the electronic equipment 10 confirms whether a message regarding verification passed transmitted by the equipment deploying system 100 is received to confirm whether the security verification is successful (step S810). For detailed steps regarding verification and positioning, reference may be made to the description of the previous embodiments, and the descriptions thereof are omitted herein. If the verification is successful, the communication transceiver 110 provides its own equipment information (for example, version number or version release time, etc.) to the equipment deploying system 100 (step S820). The electronic equipment 10 waits for the equipment deploying system 100 to confirm whether update is required (step S830). If the update is not required, the electronic equipment 10 ends the connection with the equipment deploying system 100 (step S840). It should be noted that for detailed steps of update confirmation, reference may be made to the description of the foregoing step S710, and the descriptions thereof are omitted herein. In contrast, if the update is required, the electronic equipment 10 downloads the operation configuration (i.e., update/configuration file) from the equipment deploying system 100 and confirms whether it has been downloaded (step S850). If the operation configuration is not received or the update fails, the electronic equipment 10 re-downloads the operation configuration. In contrast, if the operation configuration download is completed, the electronic equipment 10 may perform the update (step S860).

It should be noted that similarly, the foregoing steps S810 to S860 may be repeatedly performed every specific period or in response to a specific triggering behavior (for example, a situation that the electronic equipment 10 is moved, the electronic equipment 10 fails, the equipment deploying system 100 is started, etc.) to dynamically deploy the electronic equipment 10. In another aspect, for the command execution operation, once obtaining an operation configuration as a command, the electronic equipment 10 may perform the operation corresponding to the command, thereby achieving remote control.

In order to facilitate the reader's understanding of the spirit of the embodiments of the invention, an application scenario is given below for description.

Figure 9:
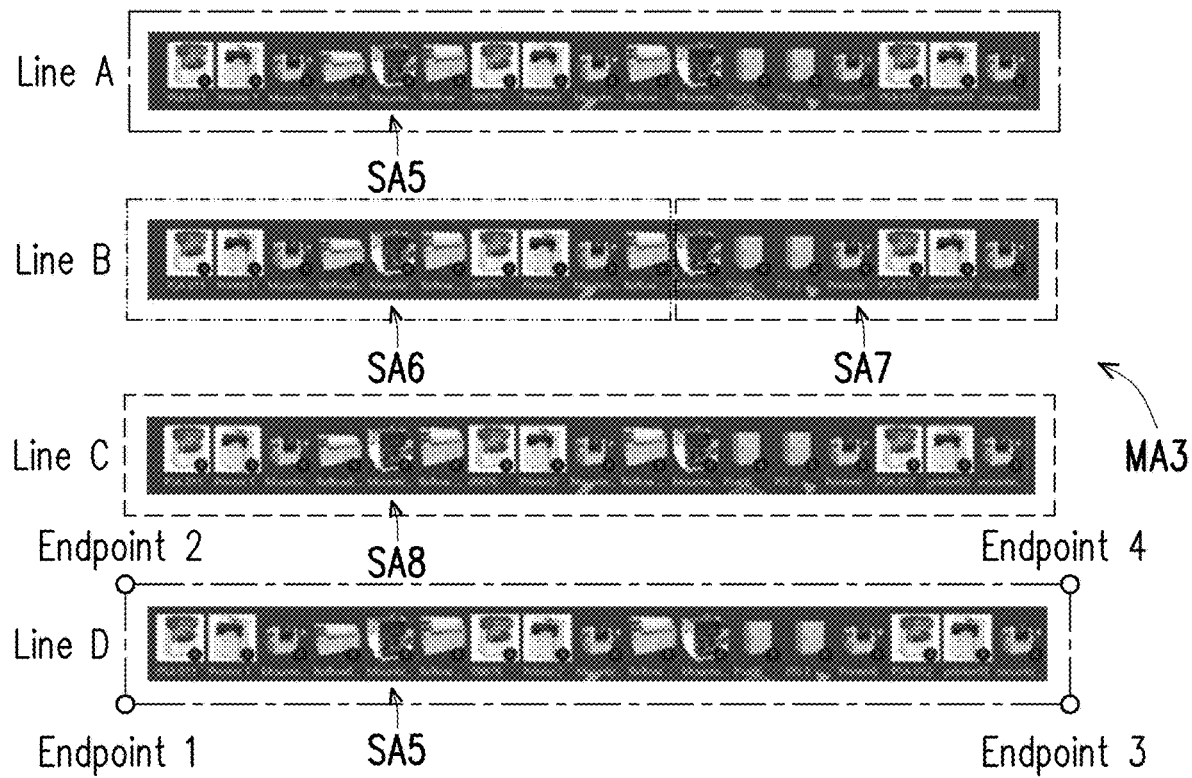
FIG. 9 is an example illustrating sub-area division of a factory pipeline.

FIG. 9 is an example illustrating sub-area division of a factory pipeline. Referring to FIG. 9, it is assumed that an area MA3 has four production lines from line A to line D. The user divides the area into four sub-areas SA5, SA6, SA7, SA8 according to requirements (indicated by different dashed lines in the figure). The processor 150 may define the ranges of the sub-areas SA5-SA8 according to Table (1).

TABLE (1)

| Sub-area | Endpoint 1 | Endpoint 2 | Endpoint 3 | Endpoint 4 |
|---|---|---|---|---|
| SA5 | (0, 0)/(0, 3) | (0, 1)/(0, 4) | (17, 0)/(17, 3) | (17, 1)/(17, 4) |
| SA6 | (0, 2) | (0, 3) | (10, 2) | (10, 3) |
| SA7 | (11, 2) | (11, 3) | (17, 2) | (17, 3) |
| SA8 | (0, 1) | (0, 2) | (17, 1) | (17, 2) |

In FIG. 9, the range of one sub-area SA5 is taken as an example, the endpoints 1, 2, 3, and 4 are additionally marked to indicate the lower left corner, the upper left corner, the lower right corner, and the upper right corner of the range of the sub-area SA5, and the other ranges may be deduced by analogy.

Table (2) shows software/configuration files corresponding to specific equipment models (i.e., equipment identification codes) in sub-areas pre-stored in the storage 130 of the equipment deploying system 100:

TABLE (2)

| Sub-area | Equipment Model | Software/Configuration File |
|---|---|---|
| SA5 | Reflow | Reflow_01.bin |
| SA5 | AOI (Automated Optical Inspection) | AOI_01.bin |
| SA6 | Reflow | Reflow_01.bin |
| SA6 | AOI | AOI_02.bin |
| SA7 | Reflow | Reflow_02.bin |
| SA7 | AOI | AOI_01.bin |
| SA8 | Reflow | Reflow_03.bin |
| SA8 | AOI | AOI_02.bin |

After the positioning and the obtainment of the equipment information of the electronic equipment 10, the processor 150 may sort an equipment information status table as shown in Table (3):

TABLE (3)

| Equipment ID | Equipment Model | Equipment Coordinates | Sub-area for Equipment | Software/Configuration File | Time |
|---|---|---|---|---|---|
| 001 | AOI | (0.5, 0.5) | SA5 | AOI_01.bin | 2019.8.15 |
| 002 | AOI | (3.5, 2.5) | SA6 | AOI_02.bin | 2019.8.15 |
| 003 | AOI | (13.5, 2.5) | SA7 | AOI_01.bin | 2019.8.15 |

The deployment of FIG. 9 may be classified into four situations:

First, the lines A and C are production lines for producing completely different products, but have the same equipment model. However, because they produce different products, even if they use the electronic equipment of the same model, setup parameters or working details to be performed may still be different. Based on the embodiments of the invention, the software used by the electronic equipment 10 can be easily and automatically updated according to different locations of the electronic equipment (even if the equipment model is the same) in the production line. For example, the Reflow electronic equipment in the line A may use the update file Reflow_01.bin, but the Reflow electronic equipment in the line C may use the update file Reflow_03.bin.

Second, the front and rear sections of the line B respectively use the electronic equipment 10 of the same model. It is assumed that the electronic equipment disposed at the front and rear sections of the line B have the same model, but it is possible that the front and rear sections are responsible for manufacturing or assembling different parts (for example, the front section for lock-up notebook computer displays and the rear section for lock-up notebook computer keyboards), and therefore, even the same electronic equipment of the same production line may respectively use different configuration files. In this case, based on the embodiments of the invention, the electronic equipment 10 of the same model can be automatically operated with different configurations at different disposition locations of the same production line.

Third, it is assumed that although the lines A and D produce different products, the configurations of the electronic equipment 10 need to be the same. Based on the embodiments of the invention, since the lines A and D both belong to the sub-area SA5, the configuration of the electronic equipment in the line A can be easily transferred/copied to the electronic equipment in the line D, or the electronic equipment in the line D can directly use the same configuration as the electronic equipment in the line A.

Fourth, based on the embodiment of the invention, when the electronic equipment 10 in any sub-area is damaged and needs to be replaced, the user only needs to transfer a new electronic equipment 10 (of the same model) into the same sub-area, and the electronic equipment 10 can be automatically updated to the required configuration, thereby greatly and effectively reducing the action of manual intervention in configuration. In addition, taking the line B as an example, assuming someone places the Reflow in the sub-area SA7 of the line B, the embodiment of the invention can immediately reflect that the electronic equipment 10 is placed in an incorrect area (the model does not match).

Based on the above, the equipment deploying system and method of the embodiments of the invention provide an automatic deployment manner based on location positioning. The locations of the electronic equipment in the set area will be monitored at any time, and the equipment deploying system accordingly determines whether each of the electronic equipment is physically located (positioned) in the specified sub-area. If the electronic equipment is in the specific sub-area, the electronic equipment can automatically update or download the related operation configuration from the equipment deploying system. Thereby, the embodiments of the invention can improve the convenience and rapidity of the electronic equipment in deployment (use).

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. An equipment deploying method, adapted for at least one electronic equipment in an area, the equipment deploying method comprising:
receiving a definition of a plurality of sub-areas in the area on a user interface (UI), wherein the UI provides a map corresponding to the area;
receiving an input of a configuring relation between an operation configuration and reference equipment information of a first electronic equipment of the at least one electronic equipment for a first sub-area of the plurality of sub-areas on the UI;

detecting location of the first electronic equipment physically located in the area and obtaining equipment information of the first electronic equipment;

determining that a currently detected location of the first electronic equipment is located in the first sub-areas on the UI and an obtained equipment information from the first electronic equipment corresponds to the reference equipment information, and further providing a corresponding operation configuration from the configuring relation of the input on the UI to the first electronic equipment which is detected as physically located in the first sub-area and corresponding to the reference equipment information, wherein the first electronic equipment is capable of performing an operation according to the corresponding operation configuration.

2. The equipment deploying method according to claim 1, wherein the equipment information comprises an equipment identification code, and the step of providing the corresponding operation configuration to the first electronic equipment physically located in the first sub-areas comprises:

obtaining the operation configuration corresponding to the equipment identification code which satisfies the reference equipment information in the corresponding sub-area.

3. The equipment deploying method according to claim 1, wherein the equipment information comprises a configuration version, and the step of providing the corresponding operation configuration to the first electronic equipment physically located in the first sub-areas comprises:

determining a version difference between the configuration version and the reference equipment information of the operation configuration; and providing the corresponding and correct operation configuration according to a comparison of the version difference, wherein the operation is related to configuration update.

4. The equipment deploying method according to claim 1, wherein the operation is related to command execution.

5. The equipment deploying method according to claim 1, further comprising:

determining, according to location of the at least one electronic equipment, whether any of the at least one electronic equipment is physically located outside the sub-areas; and disabling, in response to the determining that any of the electronic equipment is physically located outside the sub-areas, providing the operation configuration to any of the electronic equipment located outside the sub-areas.

6. The equipment deploying method according to claim 1, further comprising:

performing security verification on any of the at least one electronic equipment; and disabling, in response to that the any of the electronic equipment fails to pass the security verification, providing the operation configuration to any of the electronic equipment that fails to pass the security verification.

7. The equipment deploying method according to claim 6, wherein after the step of performing the security verification on the at least one electronic equipment, the method further comprises:

disabling, in response to that any of the electronic equipment fails to pass the security verification, obtaining the equipment information of any of the electronic equipment.

8. The equipment deploying method according to claim 6, wherein after the step of performing the security verification on the at least one electronic equipment, the method further comprises:

allowing, in response to that any of the electronic equipment passes the security verification, the next security verification on any of the electronic equipment to be ignored.

9. The equipment deploying method according to claim 1, wherein the location of the first electronic equipment is obtained by an indoor positioning mechanism.

10. The equipment deploying method according to claim 1, wherein the step of obtaining the location of the first electronic equipment in the area comprises:

receiving a definition of the area to form a coordinate system; and deciding a coordinate of the location of the first electronic equipment in the coordinate system.

11. An equipment deploying system, adapted to deploy at least one electronic equipment in an area, the equipment deploying system comprising:

a communication transceiver, configured to transmit or receive data; and a processor, electrically coupled to the communication transceiver and configured to:

receive a definition of a plurality of sub-areas in the area on a user interface (UI), wherein the UI provides a map corresponding to the area;

receive an input of a configuring relation between an operation configuration and reference equipment information of a first electronic equipment of the at least one electronic equipment for a first sub-area of the plurality of sub-areas on the UI;

detect location of the first electronic equipment physically located in the area and obtaining equipment information of the first electronic equipment;

determine that a currently detected location of the first electronic equipment is located in the first sub-areas on the UI and an obtained equipment information from the first electronic equipment corresponds to the reference equipment information, and further provide a corresponding operation configuration from the configuring relation of the input on the UI to the first electronic equipment which is detected as physically located in the first sub-area and corresponding to the reference equipment information, wherein the first electronic equipment is capable of performing an operation according to the corresponding operation configuration.

12. The equipment deploying system according to claim 11, wherein the equipment information comprises an equipment identification code, and the processor is configured to:

obtain the operation configuration corresponding to the equipment identification code which satisfies the reference equipment information in the corresponding sub-area.

13. The equipment deploying system according to claim 11, wherein the equipment information comprises a configuration version, and the processor is configured to:

determine a version difference between the configuration version and the reference equipment information of the operation configuration; and provide the corresponding and correct operation configuration according to a comparison of the version difference, wherein the operation is related to configuration update.

14. The equipment deploying system according to claim 11, wherein the operation is related to command execution.

15. The equipment deploying system according to claim 11, wherein the processor is configured to:
   determine, according to location of the at least one electronic equipment, whether any of the at least one electronic equipment is physically located outside the sub-areas; and
   disable, in response to the determining that any of the electronic equipment is physically located outside the sub-areas, providing the operation configuration to any of the electronic equipment located outside the sub-areas by the communication transceiver.

16. The equipment deploying system according to claim 11, wherein the processor is configured to:
   perform security verification on any of the at least one electronic equipment; and
   disable, in response to that any of the electronic equipment fails to pass the security verification, providing the operation configuration to any of the electronic equipment that fails to pass the security verification.

17. The equipment deploying system according to claim 16, wherein the processor is configured to:
   disable, in response to that any of the electronic equipment fails to pass the security verification, obtaining the equipment information of any of the electronic equipment.

18. The equipment deploying system according to claim 16, wherein the processor is configured to:
   allow, in response to that any of the electronic equipment passes the security verification, the next security verification on any of the electronic equipment to be ignored.

19. The equipment deploying system according to claim 11, wherein the location of the first electronic equipment is obtained by an indoor positioning mechanism.

* * * * *